(12) United States Patent
Kim et al.

(10) Patent No.: US 7,967,489 B2
(45) Date of Patent: Jun. 28, 2011

(54) OPTICAL SHEET, METHOD OF MANUFACTURING THE SAME AND DISPLAY APPARATUS HAVING THE SAME

(75) Inventors: Dong-Hoon Kim, Seoul (KR); Jin-Sung Choi, Cheonan-si (KR); Jeong-Hwan Lee, Suwon-si (KR); Seung-Mo Kim, Cheonan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 183 days.

(21) Appl. No.: 12/117,495

(22) Filed: May 8, 2008

(65) Prior Publication Data
US 2008/0278949 A1 Nov. 13, 2008

(30) Foreign Application Priority Data

May 8, 2007 (KR) .................. 10-2007-0044600

(51) Int. Cl.
*F21V 7/04* (2006.01)
(52) U.S. Cl. .................. 362/606; 362/619; 362/620
(58) Field of Classification Search .............. 362/606, 362/615, 617, 619, 620, 624, 627, 330, 339
See application file for complete search history.

(56) References Cited

U.S. PATENT DOCUMENTS

| | | | |
|---|---|---|---|
| 7,400,817 B2* | 7/2008 | Lee et al. ................ | 362/615 |
| 2007/0059549 A1 | 3/2007 | Hwang et al. | |
| 2007/0263412 A1* | 11/2007 | Lee ........................ | 362/627 |
| 2007/0279940 A1* | 12/2007 | Kim et al. ................ | 362/617 |
| 2008/0019146 A1* | 1/2008 | Wang et al. ............. | 362/606 |
| 2008/0088933 A1* | 4/2008 | Lin ......................... | 362/620 |
| 2009/0147179 A1* | 6/2009 | Yamashita et al. ...... | 362/339 |

FOREIGN PATENT DOCUMENTS

| | | |
|---|---|---|
| CN | 1710478 | 12/2005 |
| DE | 19731142 | 2/1999 |
| JP | 06250182 | 9/1994 |
| JP | 2004114419 | 4/2004 |
| JP | 2006178240 | 7/2006 |
| JP | 2006220995 | 8/2006 |
| JP | 2007011264 | 1/2007 |
| KR | 200361392 | 8/2004 |
| KR | 1020050092257 | 9/2005 |
| KR | 1020060078053 | 7/2006 |
| KR | 1020070013573 | 1/2007 |
| WO | 2005098486 | 10/2005 |
| WO | 2007046337 | 4/2007 |

OTHER PUBLICATIONS

European search report for Application No. 08005717.7 dated Aug. 8, 2008.
Communication dated Mar. 15, 2010 from European Patent Office regarding European Patent Application No. 08 005 717-7-2205.

* cited by examiner

*Primary Examiner* — Y My Quach Lee
(74) *Attorney, Agent, or Firm* — F. Chau & Associates, LLC

(57) ABSTRACT

An optical sheet includes a base film, a plurality of prism patterns and a plurality of first embossing patterns. The prism patterns are formed on an upper surface of the base film. Each of the prism patterns has the shape of a trigonal prism and includes a first inclined surface and a second inclined surface. The first and second inclined surfaces are inclined with respect to the upper surface of the base film and meet each other at a peak portion. First embossing patterns are formed at the peak portion.

11 Claims, 12 Drawing Sheets

OPTICAL SHEET, METHOD OF MANUFACTURING THE SAME AND DISPLAY APPARATUS HAVING THE SAME

CROSS-REFERENCE TO RELATED APPLICATION

This application claims priority to Korean Patent Application No. 2007-44600, filed on May 8, 2007, the contents of which are herein incorporated by reference in their entirety.

BACKGROUND OF THE INVENTION

1. Technical Field

The present invention relates to an optical sheet, a method of manufacturing the optical sheet and a display apparatus having the optical sheet. More particularly, the present invention relates to an optical sheet capable of improving optical properties of light incident into a display panel, a method of manufacturing the optical sheet, and a display apparatus having the optical sheet.

2. Discussion of the Related Art

A liquid crystal display (LCD) apparatus that displays images may be thinner and lighter than other types of display apparatuses. In addition, the LCD apparatus may consume less power. Thus, the LCD apparatus has been widely used in various fields.

The LCD apparatus does not generate light by itself. Thus, the LCD apparatus may utilize a light-generating unit for providing a display panel of the LCD apparatus with light.

In a notebook computer, a monitor, etc., the light-generating unit includes a lamp, a light-guide plate, and optical sheets. The lamp generates light. The light-guide plate guides the light generated from the lamp toward the display panel. The optical sheets include a diffusing sheet, a prism sheet, a protective sheet, etc.

Manufacturing costs increase and the thickness of the LCD apparatus becomes thicker when the number of the optical sheets, such as the diffusing sheet, the prism sheet, the protective sheet, etc., is increased.

SUMMARY OF THE INVENTION

Embodiments of the present invention provide an optical sheet capable of reducing manufacturing costs and the thickness of products, a method of manufacturing the optical sheet, and a display apparatus having the optical sheet.

An optical sheet according to an example embodiment of the present invention includes a base film, a plurality of prism patterns, and a plurality of first embossing patterns. The prism patterns are formed on an upper surface of the base film. Each of the prism patterns has the shape of a trigonal prism and includes a first inclined surface and a second inclined surface. The first and second inclined surfaces are inclined with respect to the upper surface of the base film and meet each other at a peak portion. First embossing patterns are formed at the peak portion.

The first embossing patterns may have a concave shape. The first embossing patterns may have a diameter of about 2 µm to about 3 µm.

The optical sheet may further include a plurality of second embossing patterns. The second embossing patterns are formed at a valley portion. The first inclined surface of a first prism pattern and the second inclined surface of a second prism pattern adjacent to the first prism pattern meet each other at the valley portion. The second embossing patterns may have a convex shape. For example, the second embossing patterns may have a substantially hemispherical shape or a substantially polygonal pyramid shape. The second embossing patterns may have a diameter of about 1 µm to about 2 µm.

The peak portion may have a ripple shape. An angle between the first inclined surface and the second inclined surface may be in a range of about 80 degrees to about 100 degrees.

The optical sheet may further include a backcoating layer formed on a lower surface of the base film.

An optical sheet according to an example embodiment of the present invention includes a base film, a plurality of prism patterns and a plurality of convex patterns. The prism patterns are formed on a surface of the base film. Each of the prism patterns has the shape of a trigonal prism and includes a first inclined surface and a second inclined surface. The first and second inclined surfaces are inclined with respect to the surface of the base film and meet each other at a peak portion. The first inclined surface of a first prism pattern and the second inclined surface of a second prism pattern adjacent to the first prism pattern meet each other at a valley portion. The convex patterns are formed at the valley portion. The convex patterns may have a substantially hemispherical shape or a substantially polygonal pyramid shape.

In a method of manufacturing an optical sheet according to an example embodiment of the present invention, a first master film is formed. The first master film has a plurality of first prism patterns. Each of the first prism patterns has the shape of a trigonal prism. A plurality of first embossing patterns is formed at peak portions of the first prism patterns, using a first patterning roller. The first patterning roller includes a first mesh pattern having a mesh shape formed at a surface of the first patterning roller. A second master film is formed using the first master film having the first embossing patterns. The second master film has a substantially symmetrical shape to the first master film and includes a plurality of second prism patterns. A plurality of second embossing patterns is formed at peak portions of the second prism patterns corresponding to valley portions of the first prism patterns. The second embossing patterns are formed using a second patterning roller. The second patterning roller includes a second mesh pattern having a mesh shape formed at a surface of the second patterning roller. An optical sheet is formed using the second master film having the second embossing patterns. The optical sheet includes a plurality of third prism patterns and a plurality of third embossing patterns formed at peak portions of the third prism patterns and a plurality of fourth embossing patterns formed at valley portions of the third prism patterns. The third embossing patterns correspond to the first embossing patterns. The fourth embossing patterns correspond to the second embossing patterns.

A display apparatus according to an example embodiment of the present invention includes a light-generating unit, an optical sheet and a display panel. The light-generating unit generates light. The optical sheet is disposed on the light-generating unit and includes a base film, a plurality of prism patterns, a plurality of first embossing patterns, and a plurality of second embossing patterns. The prism patterns are formed on an upper surface of the base film. Each of the prism patterns has the shape of a trigonal prism and includes a first inclined surface and a second inclined surface. The first and second inclined surfaces are inclined with respect to the upper surface of the base film and meet each other at a peak portion. The first embossing patterns are formed at the peak portion. The first inclined surface of a first prism pattern and the second inclined surface of a second prism pattern adjacent to the first prism pattern meet each other at a valley portion. The second embossing patterns are formed at the valley portion.

The display panel is disposed on the optical sheet to display an image. The first embossing patterns may have a concave shape and the second embossing patterns may have a convex shape. The second embossing patterns may have a substantially hemispherical shape or a substantially polygonal pyramid shape. Each of the second embossing patterns may be smaller than each of the first embossing patterns.

In accordance with embodiments of the present invention, the optical sheet, the method of manufacturing the optical sheet and the display apparatus having the optical sheet reduce manufacturing costs and reduce the thickness of products since the number of optical sheets is decreased.

BRIEF DESCRIPTION OF THE DRAWINGS

Embodiments of the present invention can be understood in more detail from the following description taken in conjunction with the accompanying drawings, in which.

DESCRIPTION OF THE EMBODIMENTS

Figure 1:
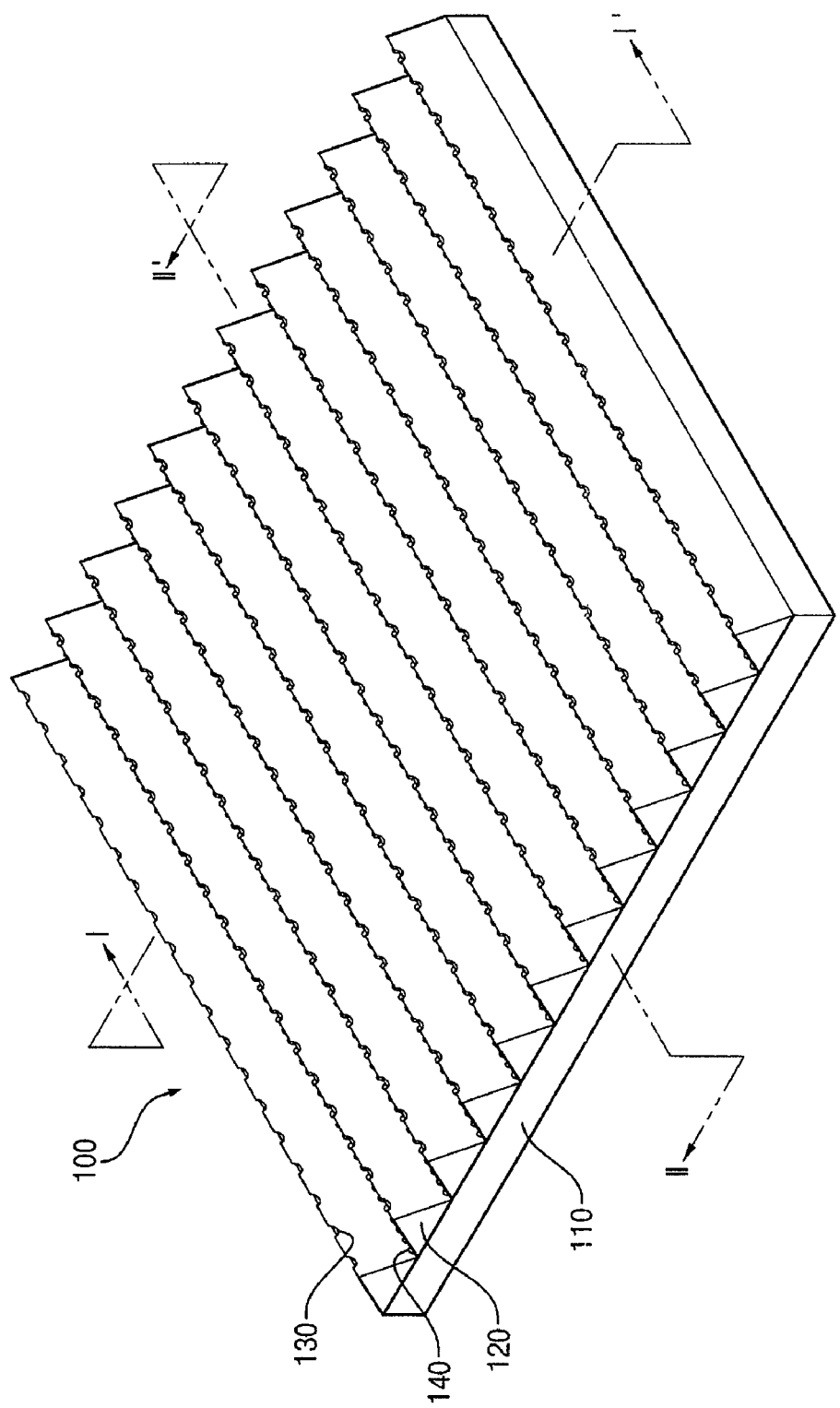
FIG. 1 is a perspective view illustrating an optical sheet according to an example embodiment of the present invention.

The invention is described more fully hereinafter with reference to the accompanying drawings, in which embodiments of the invention are shown. This invention may, however, be embodied in many different forms and should not be construed as limited to the embodiments set forth herein. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present.

Figure 2:
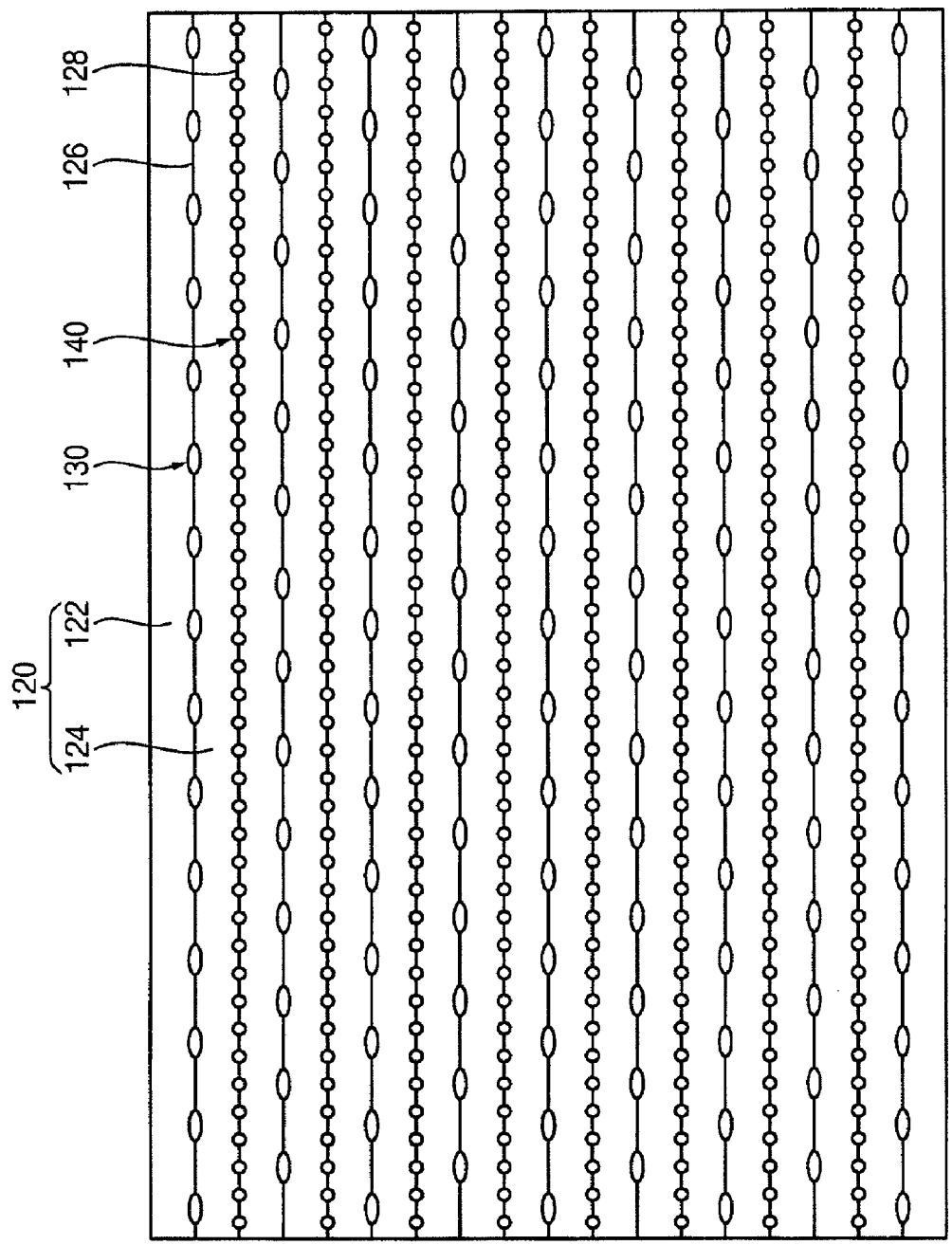
FIG. 2 is a plan view illustrating the optical sheet shown in FIG. 1.
Figure 3:
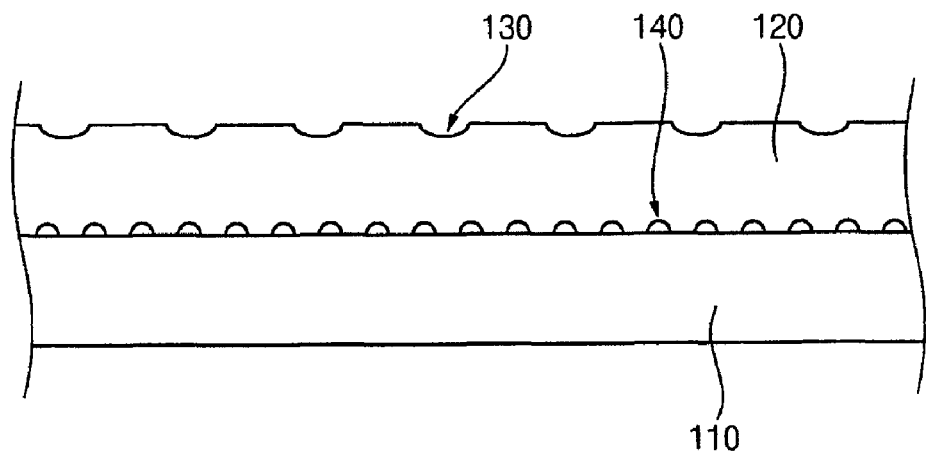
FIG. 3 is a cross-sectional view taken along the line I-I' in FIG. 1.
Figure 4:
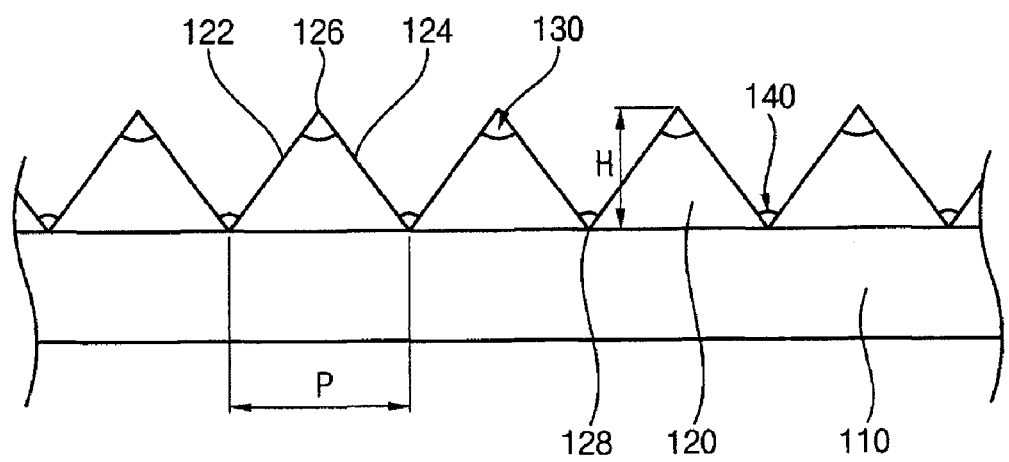
FIG. 4 is a cross-sectional view taken along the line II-II' in FIG. 1.

FIG. 1 is a perspective view illustrating an optical sheet according to an example embodiment of the present invention. FIG. 2 is a plan view illustrating the optical sheet shown in FIG. 1. FIG. 3 is a cross-sectional view taken along the line I-I' in FIG. 1. FIG. 4 is a cross-sectional view taken along the line II-II' in FIG. 1.

Referring to FIGS. 1 to 4, an optical sheet 100 according to an example embodiment of the present invention includes a base film 110, a plurality of prism patterns 120 and a plurality of first embossing patterns 130. The prism patterns 120 and the first embossing patterns 130 are formed on an upper surface of the base film 110.

The base film 110 includes a transparent material. Thus, light may pass through the base film 110. For example, an example of the material for the base film 110 may include polyacrylate, polycarbonate, polysulfone, polystyrene, polyethylene, polyvinyl chloride, polyvinyl alcohol, polyester, etc. These materials may be used alone or in a combination with each other or with other materials. For example, the base film 110 may be formed using polyethylene terephthalate (PET).

The prism patterns 120 are formed on the upper surface of the base film 110. The prism patterns 120 may have a polygonal prism shape. For example, the prism patterns 120 may have a trigonal prism shape. The prism patterns 120 are substantially parallel with one another. In addition, the prism patterns 120 are adjacent to one another.

The prism patterns 120 changes a path, which is inclined with respect to an upper surface of the base film 110, of light incident into the base film 110 so that the light may have a path substantially perpendicular to the upper surface of the base film 110. Each of the prism patterns 120 includes a first inclined surface 122 and a second inclined surface 124. The first inclined surfaces 122 are inclined by a first predetermined angle with respect to the upper surface of the base film 110. The second inclined surfaces 124 are inclined by a second predetermined angle with respect to the upper surface of the base film 110.

Each of the first inclined surfaces 122 include a first upper side and a first lower side opposite to the first upper side, and each of the second inclined surfaces include a second upper side and a second lower side opposite to the upper side. In one prism pattern 120, the first upper side of the first inclined surface 122 meets the second upper side of the second inclined surface 124 to form a peak portion 126. In two prism patterns 120 adjacent to each other, the first lower side of the first inclined surface 122 meets the second lower side of the second inclined surface 124 to form a valley portion 128. In an example embodiment of the present invention, the prism patterns 120 may have an isosceles triangular cross-section when a distance between the upper side and the lower side of the first inclined surface 122 is substantially the same as a distance between the upper side and the lower side of the second inclined surface 124. In another example embodiment of the present invention, the prism patterns 120 may have a scalene triangular cross-section when the distance between the upper side and the lower side of the first inclined surface 122 is substantially different from the distance between the upper side and the lower side of the second inclined surface 124.

Sizes of the prism patterns 120 may be determined based on an efficiency of concentrated light or viewing angle. In an example embodiment of the present invention, the prism patterns 120 may have a pitch P of about 30 μm to about 100 μm and a height H of about 20 μm to about 30 μm. For example, the prism patterns 120 may have a pitch of about 50 μm and a height of about 25 μm. In an example embodiment of the present invention, an angle between the first inclined surface 122 and the second inclined surface 124 of each of the prism patterns 120 may be in a range of about 80° to about 100°. For example, the angle between the first inclined surface 122 and the second inclined surface 124 of each of the prism patterns 120 may be about 90°.

The prism patterns 120 are formed using a transparent material so that light passes through the prism patterns 120. In addition, the prism patterns 120 are formed using a material having a relatively high hardness for preventing the prism patterns 120 from being scratched. For example, the prism patterns 120 may be formed using acrylic resin having a reflective index of about 1.6 or more.

The first embossing patterns 130 are formed by partially digging an upper portion of each of the prism patterns 120 to a predetermined depth, so that the optical sheet 100 may diffuse light. The first embossing patterns 130 may have a concave shape. For example, each of the first embossing patterns 130 may be elliptical and have a long diameter of about 2 μm to about 3 μm.

The first embossing patterns 130 are formed at the peak portions 126. The first embossing patterns 130 may be spaced apart from one another by a predetermined distance. The first embossing patterns 130 may be irregularly spaced apart from one another. Brightness may be reduced when a density of the first embossing patterns 130, which is a ratio of an area of the first embossing patterns 130 to an area of the prism patterns 120, increases. Thus, the density of the first embossing patterns 130 may vary according to required brightness levels of display devices. For example, the density of the first embossing patterns 130 may increase when the optical sheet 100 is employed in display devices requiring high hardness. For another example, the density of the first embossing patterns 130 and sizes of the first embossing patterns 130 may be decreased when the optical sheet 100 is employed in display devices requiring a high efficiency of concentrated light. The density of the first embossing patterns 130 may be about 0.5 or less.

The first embossing patterns 130 diffuse light so that a viewing angle may be improved when the first embossing patterns 130 are formed at the peak portions 126. In addition, when the first embossing patterns 130 are formed at the peak portions 126, a contact area between the optical sheet 100 and a protective sheet or a display panel disposed on the optical sheet 100 may be reduced so that the protective sheet or the display panel is prevented from being scratched.

The optical sheet 100 may further include second embossing patterns 140. The second embossing patterns 140 diffuse and concentrate light.

The second embossing patterns 140 are formed at the valley portions 128 where a lower side of the first inclined surface 122 makes contact with a lower side of the second inclined surface 124.

The second embossing patterns 140 may have a convex shape and protrude to a predetermined height between the first and second inclined surfaces 122 and 124. The second embossing patterns 140 may be smaller than the first embossing patterns 130 in order to diffuse and concentrate light. For example, the second embossing patterns 140 may have a diameter of about 1 μm to about 2 μm. In an example embodiment of the present invention, the second embossing patterns 140 may have a substantially hemispherical shape. In other example embodiments of the present invention, the second embossing patterns 140 may have a polygonal pyramid shape. For example, the second embossing patterns 140 may have a triangular pyramid shape or a quadrangular pyramid shape. In an example embodiment of the present invention, the second embossing patterns 140 may be spaced apart from one another by a predetermined distance. In another example embodiment of the present invention, the second embossing patterns 140 may be irregularly spaced apart from one another.

The second embossing patterns 140 may control a haze level of the optical sheet 100. The haze level of the optical sheet 100 may be controlled such that the brightness is not reduced because a haze level is substantially inversely proportional to the transmittance of the optical sheet 100 and the brightness. For example, the second embossing patterns 140 are formed so that the optical sheet 100 has a haze level of about 20% to about 30%.

The haze level of the optical sheet increases so that the optical sheet may be easily handled when the second embossing patterns 140 are formed at the valley portions 128. The second embossing patterns 140 formed at the valley portions 128 diffuse and concentrate light so that the optical sheet 100 according to an example embodiment of the present invention may serve as a diffusing sheet or a light concentrating sheet.

In another example embodiment of the present invention, the second embossing patterns 140 may be formed at the valley portions 128 and the first embossing patterns 130 may be omitted.

Figure 5:
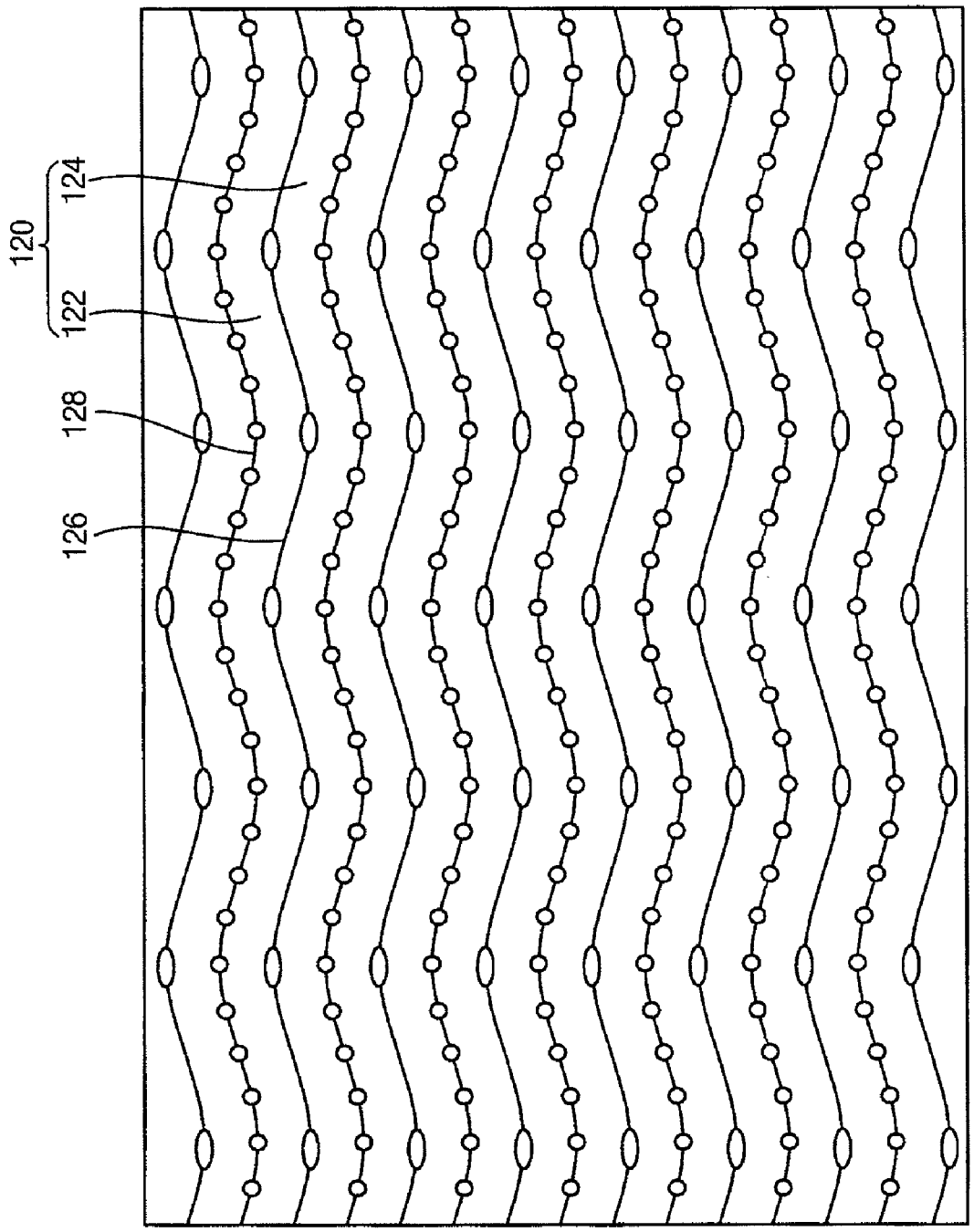
FIG. 5 is a plan view illustrating an optical sheet according to an example embodiment of the present invention.

FIG. 5 is a plan view illustrating an optical sheet according to another example embodiment of the present invention. The optical sheet shown in FIG. 5 comprises components substantially the same as or similar to those of the optical sheet illustrated referring to FIG. 2 except with respect to, for example, the shape of the prism pattern.

Referring to FIG. 5, the prism patterns 120 are bent so that each of the prism patterns 120 substantially has a wave form. As shown in FIG. 5, the peak portions 126 and the valley portions 128 include the wave form. The peak portions 126 and pixels having a portion that is extended in a first direction may generate a moiré phenomenon when the peak portions 126 are extended in the first direction. The moiré phenomenon may be prevented when the peak portions 126 and the valley portions 128 have the wave form.

In another example embodiment of the present invention, the peak portions 126 may have the wave form and the valley portions 128 may be extended in the first direction.

Figure 6:
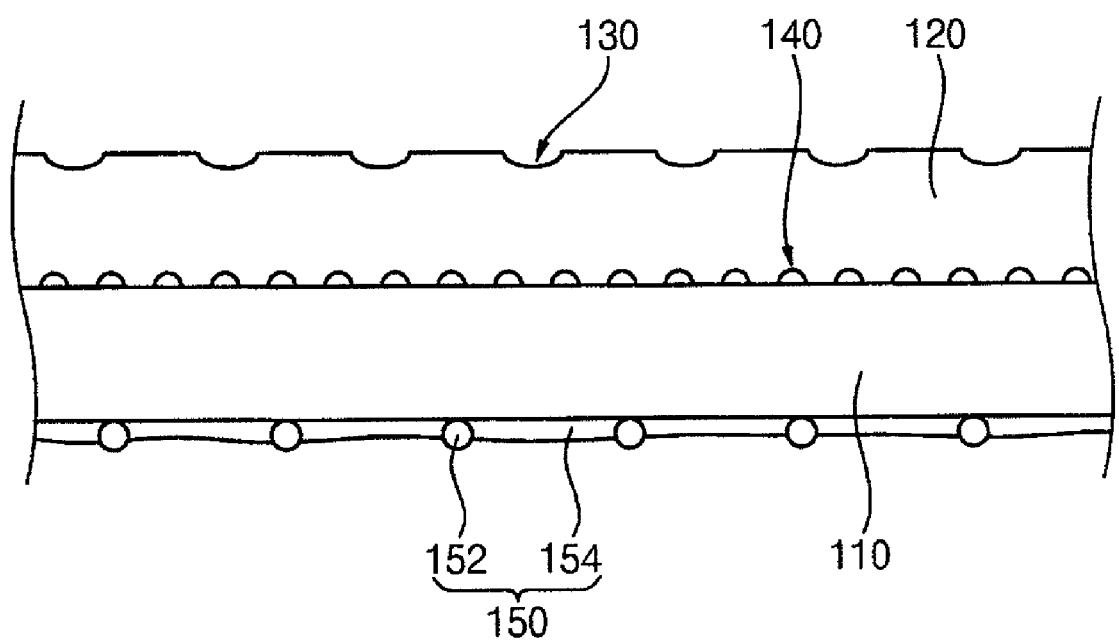
FIG. 6 is a cross-sectional view illustrating an optical sheet according to an example embodiment of the present invention.

FIG. 6 is a cross-sectional view illustrating an optical sheet according to an example embodiment of the present invention. The optical sheet shown in FIG. 6 has components substantially the same as or similar to those of the optical sheet illustrated referring to FIG. 3 except with respect to, for example, a backcoating layer.

Referring to FIG. 6, the optical sheet 100 may further include a backcoating layer 150. The backcoating layer 150 is formed on a lower surface of the base film 110.

The backcoating layer 150 may prevent the optical sheet 100 from adhering closely to a light-guide plate or a diffusing plate so that a frictional force between the optical sheet 100 and the light-guide plate or between the optical sheet 100 and the diffusing plate may be reduced. In addition, the backcoating layer 150 may prevent the moiré phenomenon so that display quality may be improved. The backcoating layer 150 may further prevent the optical sheet 100, the light-guide plate and the diffusing plate from being electrically charged.

In an example embodiment of the present invention, the backcoating layer 150 includes a plurality of beads 152 and a binder resin 154. The beads 152 are fixed in a predetermined position by the binder resin 154. A density of the beads, which is the number of the beads 152 per unit area, may be minimized since the beads 152 may scratch the light-guide plate or the diffusing plate. For example, each of the beads 152 may have a substantially circular shape with a diameter of about 1 μm to about 10 μm.

Figure 7:
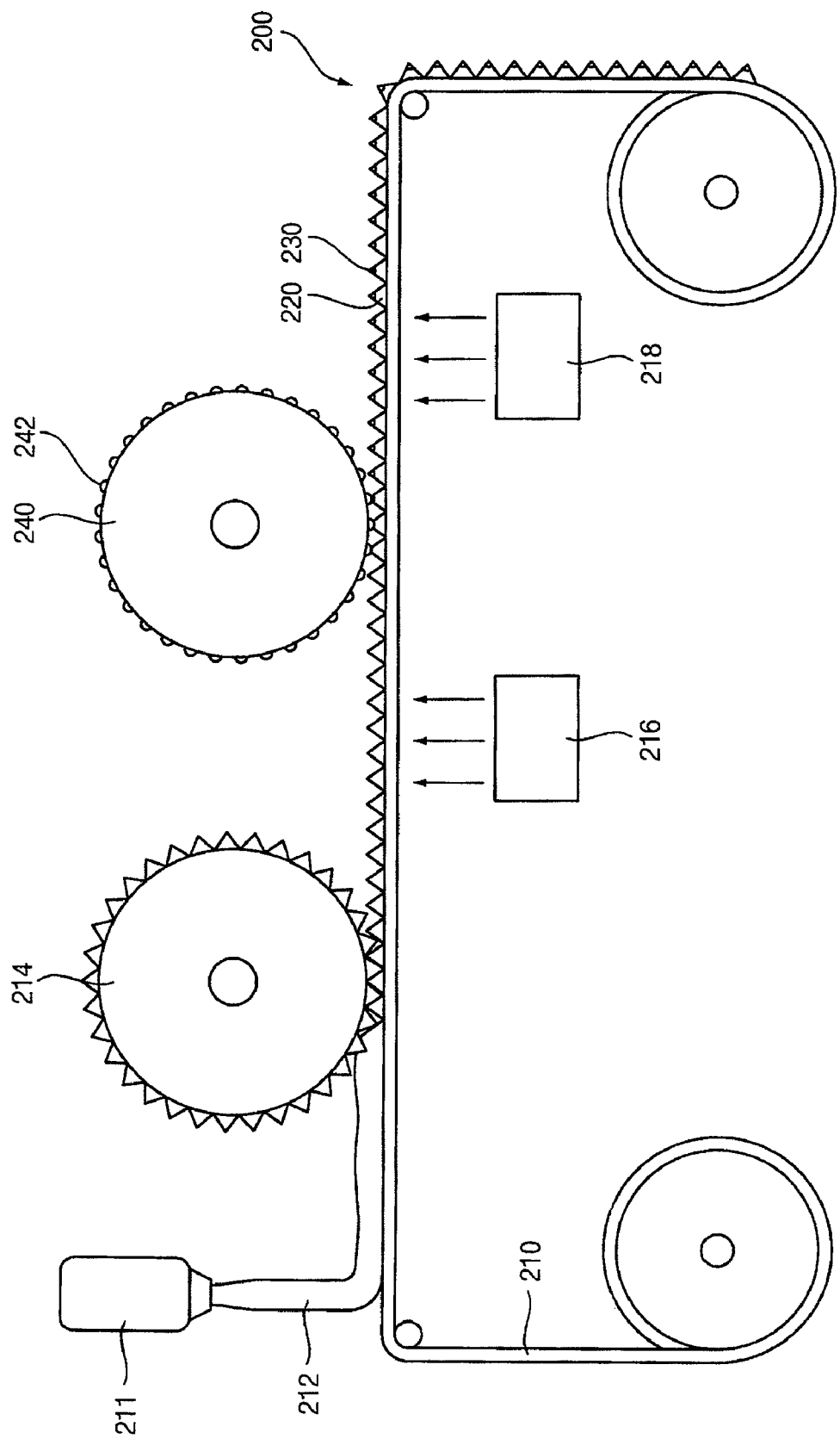
FIG. 7 is a cross-sectional view illustrating a process for manufacturing a first master film in accordance with an example embodiment of the present invention.
Figure 8:
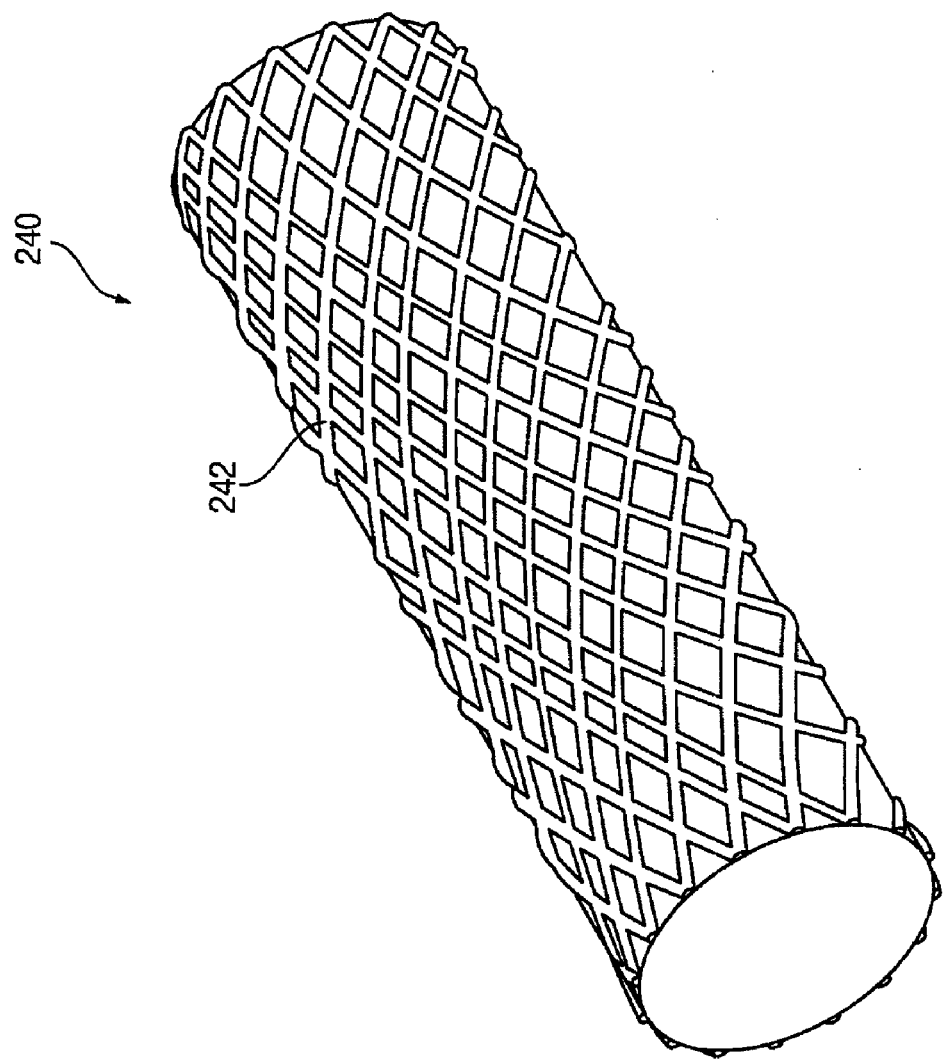
FIG. 8 is a perspective view illustrating the first patterning roller shown in FIG. 7.

FIG. 7 is a cross-sectional view illustrating a process for manufacturing a first master film in accordance with an example embodiment of the present invention. FIG. 8 is a perspective view illustrating the first patterning roller shown in FIG. 7.

Referring to FIGS. 7 and 8, a first master film 200 including a plurality of first prism patterns 220 is manufactured. The first prism patterns 220 may have a polygonal prism shape. For example, the first prism patterns 220 may have a trigonal prism shape. A plurality of first embossing patterns 230 is formed at a peak portion of each of the prism patterns 220.

For example, a coating material 212 is coated on the base film 210. Then, the coating material 212 coated on the base film 210 is processed by a mold roller 214 including a pattern, which is formed on a surface of the mold roller 214, having a substantially symmetrical shape to the first prism patterns 220 so that the first prism patterns 220 are formed on the base film 210. The coating material 212 is coated on the base film 210 by a coating device 211 before the base film 210 reaches the mold roller 214. For example, the coating material 212 may include a light curable resin that is cured by ultraviolet light. Alternatively, the coating material 212 may include a thermosetting resin that is cured by heat.

The first prism patterns 220 formed by the mold roller 214 are pre-cured by ultraviolet light generated by a first ultraviolet light source 216 to have a predetermined shape.

As shown in FIGS. 7 and 8, the first embossing patterns 230 are formed by a first patterning roller 240. The first patterning roller 240 includes a pattern having a mesh shape which is formed on a surface of the first patterning roller 240. The mesh shaped pattern protrudes from the surface of the first patterning roller 240 to a predetermined height. The pre-cured first prism patterns 220 are processed by the first patterning roller 240 so that the first embossing patterns 230, which have a shape corresponding to the pattern having the mesh shape, are formed at the peak portion of the first prism patterns 220.

The first prism patterns 220 including the first embossing patterns 230 formed at the peak portion are fully cured by ultraviolet light generated by a second ultraviolet light source 218.

Alternatively, a roller may be convolved with the first master film 200 including the first prism patterns 220 formed on the master film 200. The first patterning roller 240 may contact the roller having the first master film 200 so that the first embossing patterns 230 may be formed at the peak portions.

Figure 9:
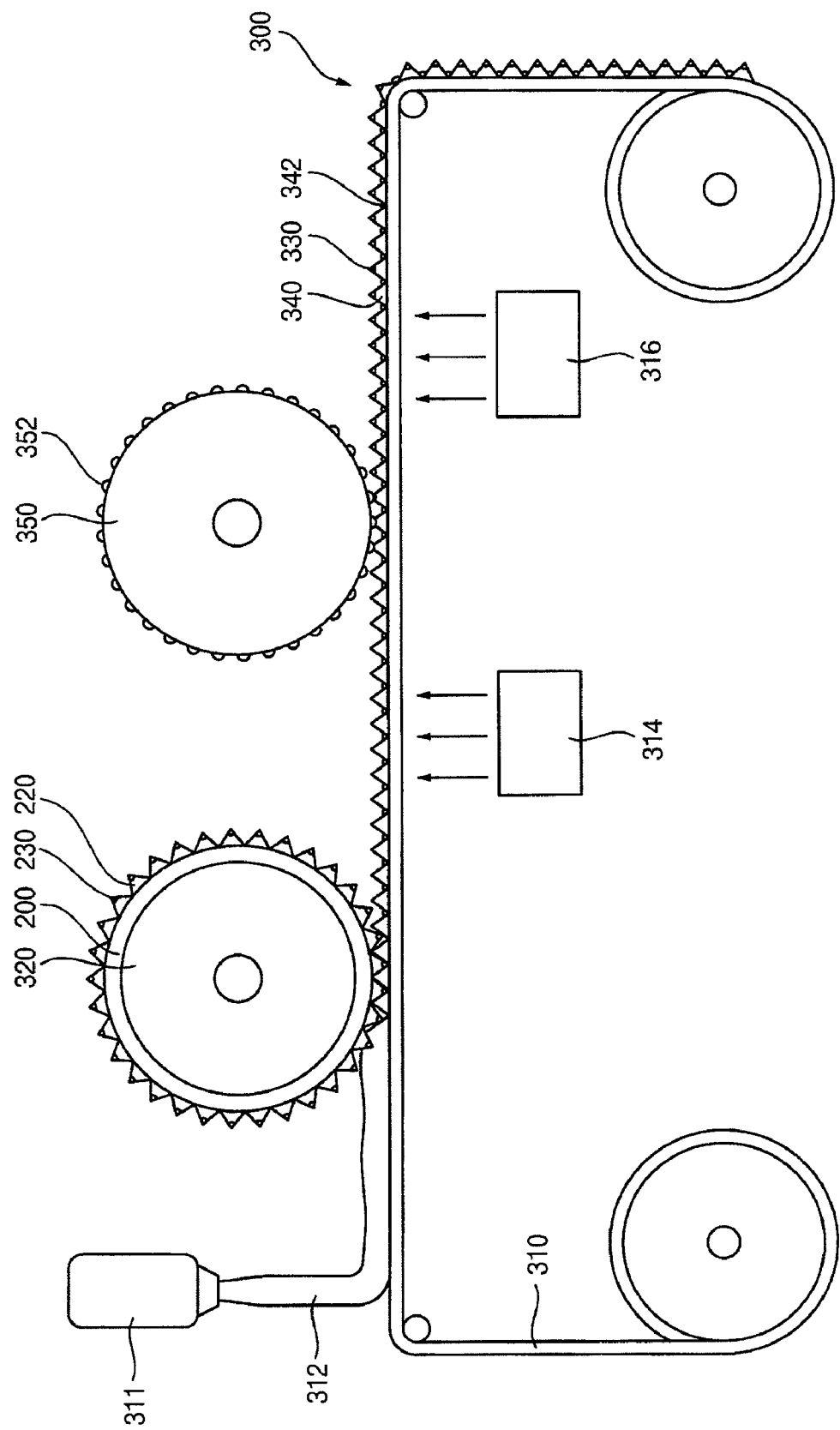
FIG. 9 is a cross-sectional view illustrating a process for manufacturing a second master film in accordance with an example embodiment of the present invention.
Figure 10:
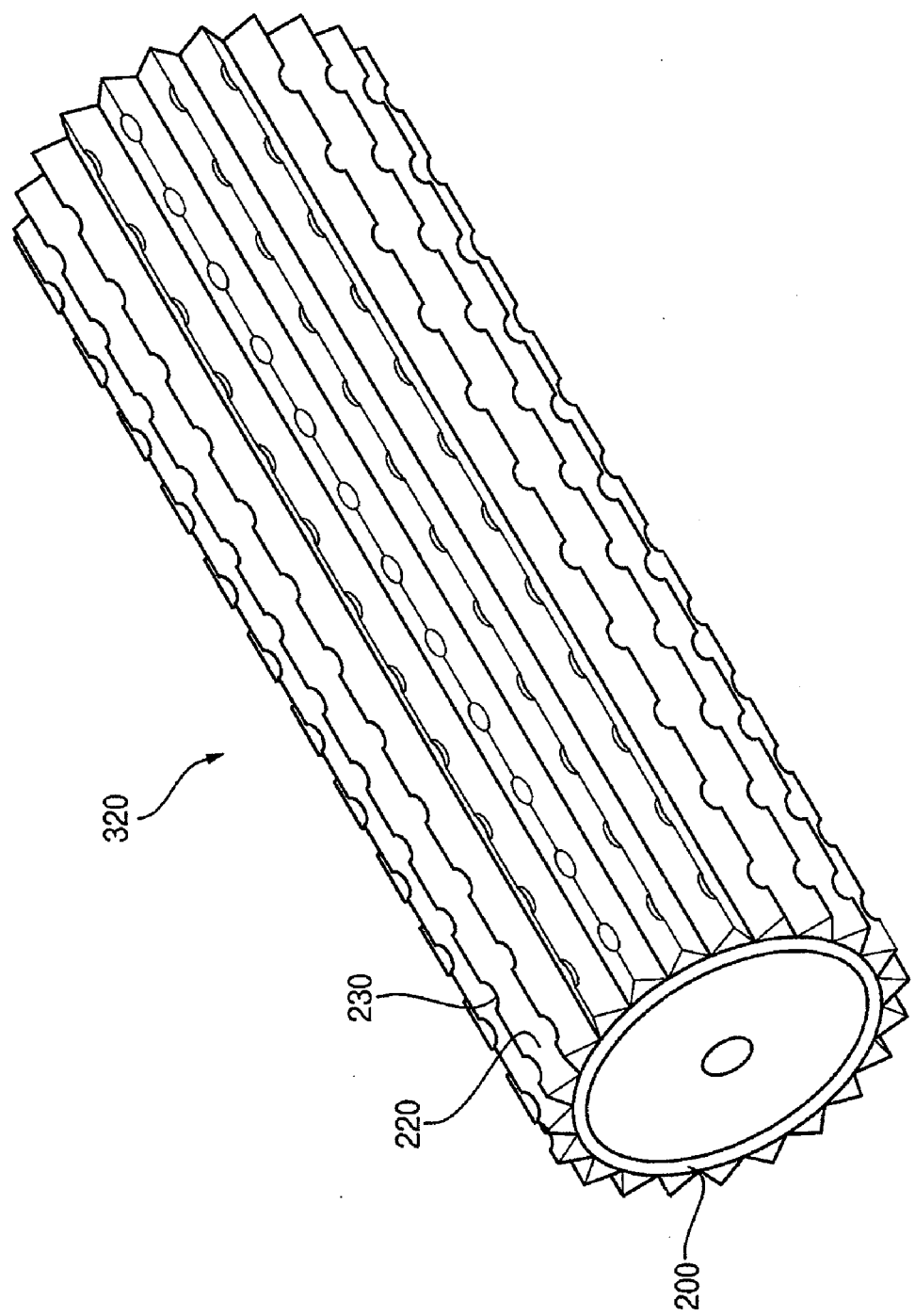
FIG. 10 is a perspective view illustrating the first master roller shown in FIG. 9.

FIG. 9 is a cross-sectional view illustrating a process for manufacturing a second master film in accordance with an embodiment of the present invention. FIG. 10 is a perspective view illustrating the first master roller shown in FIG. 9.

Referring to FIGS. 9 and 10, a second master film 300 having a substantially symmetrical shape to the first master film 200 is formed by the first master film 200. A plurality of first embossing patterns 230 is formed at peak portions of the first prism patterns 220.

A coating material 312 is coated on the base film 310. The coating material 312 coated on the base film 310 is processed by a first master roller 320 convolved with the first master film 200 so that the coating material coated on the base film 310 includes patterns having a substantially symmetrical shape to the first master film 200. For example, a plurality of second prism patterns 340 is formed on the base film 310 and a plurality of convex patterns 342 having a substantially symmetrical shape to the first embossing patterns 230 is formed at valley portions of the second prism patterns 340. The coating material 312 is coated on the base film 310 by a coating device 311 before the base film 310 reaches the first master roller 320.

The second prism patterns 340 formed by the first master roller 320 are pre-cured by ultraviolet light generated by the first ultraviolet light source 314 for having a predetermined shape.

The second embossing patterns 330 may be formed by a second patterning roller 350. The second patterning roller 350 includes a second mesh pattern 352 formed on a surface of the second patterning roller 350. The second mesh pattern 352 protrudes from the surface of the second patterning roller 350 to a predetermined height. The second mesh pattern 352 may have a net knot smaller than that of the first mesh pattern 242. The second embossing patterns 330 corresponding to the second mesh pattern 352 are formed at the peak portions of the second prism patterns 340 when the pre-cured second prism patterns 340 are processed by the second patterning roller 350.

The second prism patterns 340 including the second embossing patterns 330 formed at the peak portions are fully cured by ultraviolet light generated by the second ultraviolet light source 316.

Alternatively, a roller may be convolved with the second master film 300 including the second prism patterns 340 formed on the second master film 300. The second patterning roller 350 contacts the roller having the second master film 300 so that second embossing patterns 330 may be formed at the peak portions of the second prism patterns 340.

Figure 11:
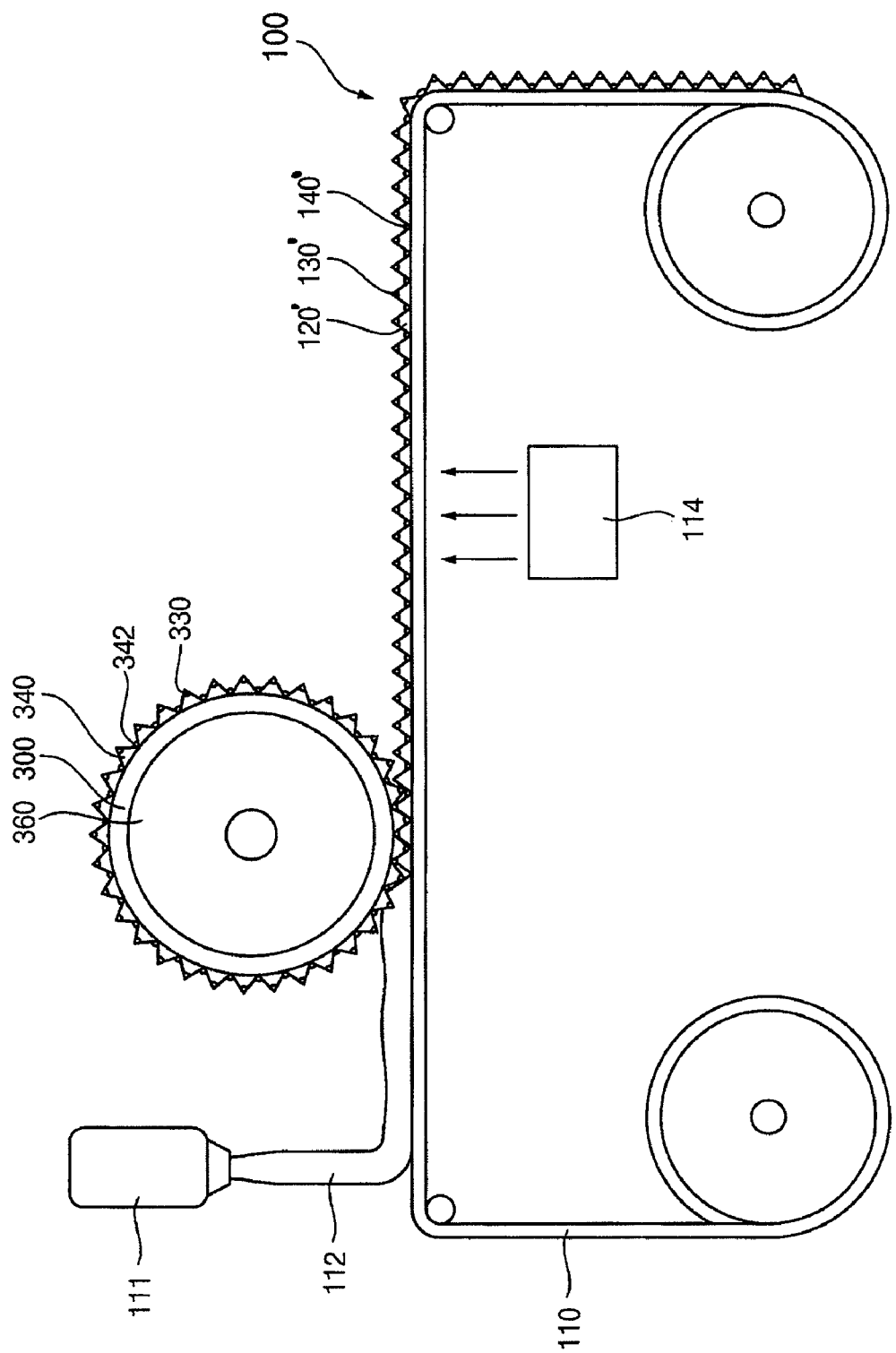
FIG. 11 is a cross-sectional view illustrating a process for manufacturing an optical sheet according to an example embodiment of the present invention.
Figure 12:
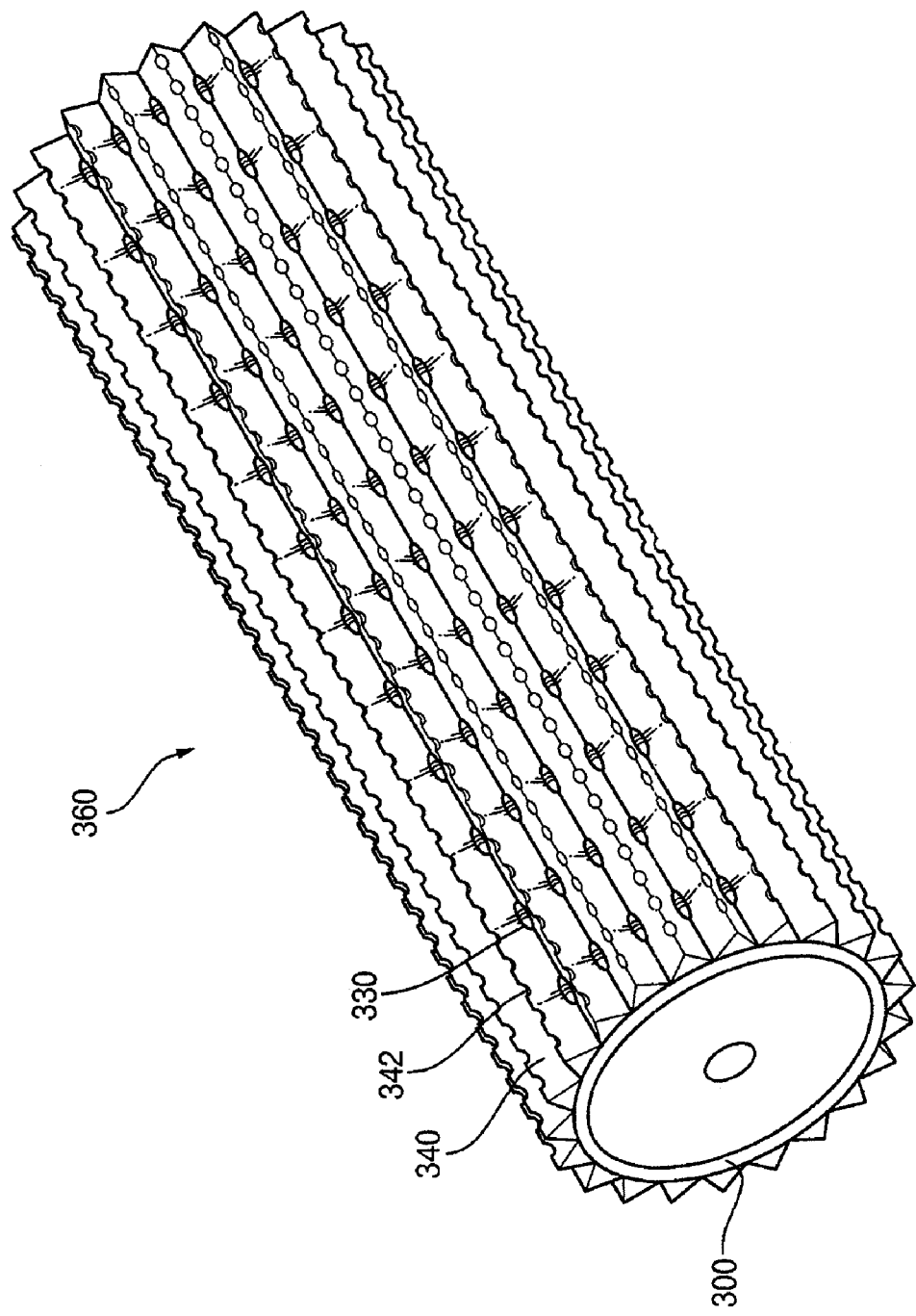
FIG. 12 is a perspective view illustrating the second master roller shown in FIG. 11.

FIG. 11 is a cross-sectional view illustrating a process for manufacturing an optical sheet according to an example embodiment of the present invention. FIG. 12 is a perspective view illustrating the second master roller shown in FIG. 11.

Referring to FIGS. 11 and 12, the optical sheet 100 is manufactured by the second master film 300 including the second prism patterns 340, the convex patterns 342 and the second embossing patterns 330.

A coating material 112 is coated on the base film 110. The coating material 112 coated on the base film 110 is processed by a second master roller 360 convolved with the second master film 300 so that the coating material 112 coated on the base film 110 includes patterns having a substantially symmetrical shape to that formed on the second master film 300. For example, a plurality of third prism patterns 120' is formed on the base film 110. The third prism patterns 120' may have a trigonal prism shape. A plurality of third embossing patterns 130' having a substantially symmetrical shape to that of the convex patterns 342 is formed at peak portions of the third prism patterns 120', and a plurality of fourth embossing patterns 140' having a substantially symmetrical shape to that of the second embossing patterns 330 is formed at valley portions of the third prism patterns 120'. The third embossing patterns 130' have a shape substantially the same as or similar to that of the first embossing patterns 230 shown in FIG. 7. A coating material 112 is coated on the base film by a coating device 111 before the base film 110 reaches the second master roller 360.

The third prism patterns 120' formed by the second master roller 360 are cured by ultraviolet light generated by the ultraviolet light source 114.

The base film 110 including the third prism patterns 120', the third embossing patterns 130' and the fourth embossing patterns 140' formed thereon is cut to a predetermined size so that the optical sheet 100 is manufactured.

Figure 13:
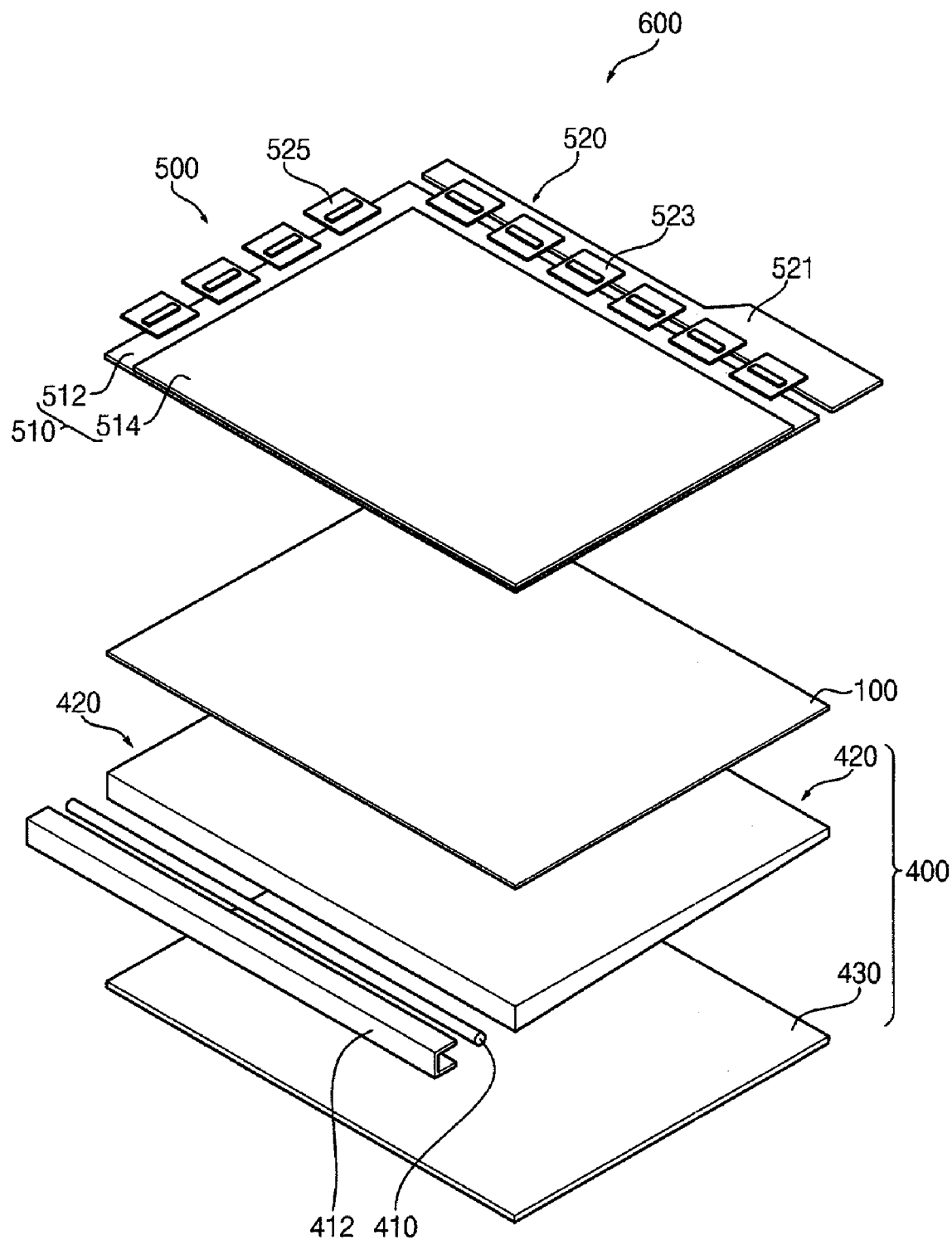
FIG. 13 is an exploded perspective view illustrating a display apparatus according to an example embodiment of the present invention.

FIG. 13 is an exploded perspective view illustrating a display apparatus according to an example embodiment of the present invention.

A display apparatus according to an example embodiment of the present invention includes a light-generating unit 400, an optical sheet 100 and a display unit 500.

The light-generating unit 400 is disposed under the display unit 500. The light-generating unit 400 provides the display unit 500 with light. The light-generating unit 400 includes a lamp 410 and a light-guide plate 420. The lamp 410 generates substantially linear light. The light-guide plate 420 changes the linear light into planar light, and guides the planar light toward the display unit 500.

The lamp 410 is disposed adjacent to at least one lateral surface of the light-guide plate 420. The lamp 410 may include a cold cathode fluorescent lamp (CCFL) having the shape of a cylinder which has a small diameter and a long length. Alternatively, the lamp 420 may include a light-emitting diode (LED).

The light-guide plate 420 guides the light generated from the lamp 410. The light-guide plate 420 may include a transparent material so that loss of the light may be prevented. Examples of the material used for the light-guide plate 420 may include polymethyl methacrylate (PMMA), polycarbonate (PC), etc.

The thickness of the light-guide plate 420 may be decreased as the distance from the lamp increases. For example, the light-guide plate 420 may have a wedge shape as shown. Alternatively, the thickness of the light-guide plate 420 may be uniform. For example, the light plate 420 may have the shape of a rectangular plate.

A plurality of reflective patterns (not shown) may be formed on a lower surface of the light-guide plate. For example, the reflective patterns may include a printing pattern, a convex pattern, etc. The reflective patterns scatter and reflect light incident into the light-guide plate 420. Light inclined by an angle, which is larger than a critical angle, with respect to a light-emitting surface of the light-guide plate 420, is emitted from the light-guide plate 420 toward a display panel 510.

The light-generating unit 400 may further include a lamp cover 412 which covers the lamp 410. The lamp cover 412 protects the lamp 410 and reflects light generated from the lamp 410 toward the light-guide plate 420. Thus, the lamp cover 412 may improve an efficiency of the light.

In FIG. 13, the light-generating unit 400 includes a lamp 410 disposed adjacent to the lateral surface of the light-guide plate 420. However, in another example embodiment of the present invention, the light-generating unit 400 may include a plurality of lamps disposed under the display panel 510.

The light-generating unit 400 may further include a reflective sheet 430 disposed under the light-guide plate 420. The reflective sheet 430 reflects light emitted from a lower surface of the light-guide plate 420 toward the light-guide plate 420. Thus, the reflective sheet 430 may improve a usage efficiency of the light.

The optical sheet 100 is disposed on the light-guide plate 420. The optical sheet 100 may have a structure substantially the same as or similar to that of the optical sheet illustrated referring to FIGS. 1 to 6.

A diffusing sheet (not shown) may be disposed between the light-guide plate 420 and the optical sheet 100. In addition, a protective sheet (not shown) may be disposed on the optical sheet 100.

The display unit 500 is disposed on the optical sheet 100. The display unit 500 includes a display panel 510 displaying images and a driving part 520 driving the display panel 510.

The display panel 510 includes a first substrate 512, a second substrate 514 opposite to the first substrate 512 and a liquid crystal layer (not shown) disposed between the first substrate 512 and the second substrate 514.

The first substrate 512 may include a thin-film transistor (TFT) substrate which includes TFTs that are switching elements, formed in a matrix shape. The TFTs include a source terminal connected to a data line, a gate terminal connected to a gate line, and a drain terminal connected to a pixel electrode which includes a transparent conductive material.

The second substrate 514 may include a color filter substrate which includes a red color filter, a green color filter and a blue color filter formed in a thin-film form. The second substrate 514 may further include a common electrode which includes a transparent conductive material. Alternatively, the color filters may be formed on the first substrate 512.

The TFT is turned on when a gate signal is applied to the gate terminal. A data signal is applied to the pixel electrode when the TFT is turned on. Thus, an electric field is formed between the pixel electrode and the common electrode. The electric field changes arrangement of liquid crystal molecules of the liquid crystal layer. The arrangement of the liquid crystal molecules controls the amount of light passing through the liquid crystal layer so that the display panel may display images having a predetermined grayscale.

The driving part 520 includes a source printed circuit board (PCB) 521, a data driving circuit film 523 and a gate driving circuit film 525. The source PCB 521 outputs various control signals for driving the display panel 510. The data driving circuit film 523 connects the source PCB 521 with the display panel 510. The gate driving circuit film 525 is connected to the display panel 510.

The data driving circuit film 523 is connected to the data lines of the first substrate 512. The gate driving circuit film 525 is connected to the gate lines of the first substrate 512. The data driving circuit film 523 and the gate driving circuit film 525 include a driving chip. The driving chip outputs a driving signal for driving the display panel 510 in response to the control signals outputted from the source PCB 521. For example, the data driving circuit film 523 and the gate driving circuit film 525 may be formed in a form of a tape carrier package (TCP) or a chip-on-film (COF).

The driving part 520 may further include a gate PCB (not shown) connected to the driving circuit film 525.

Table 1 illustrates brightness of a product according to different optical sheets. In Table 1, Example 1 relates to a product employing an optical sheet including first embossing patterns formed at peak portions and Example 2 relates to a product employing an optical sheet including first embossing patterns formed at peak portions of prism patterns and first convex patterns formed at valley portions of the prism patterns.

TABLE 1

| | Example 1 | Example 2 |
|---|---|---|
| Brightness of backlight assembly | 4811 nits | 5132 nits |
| Ratio of increase or decrease | 100.00% | 106.67% |
| Brightness of display panel | 369.1 nits | 396.3 nits |
| Ratio of increase or decrease | 100.00% | 107.37% |

Referring to Table 1, the brightness of the backlight assembly of Example 2 was increased by about 6.67% with respect to the brightness of the backlight assembly of Example 1, and the brightness of the display panel of Example 2 was increased by 7.37% with respect to the brightness of the display panel of Example 1.

Products employing the optical sheet according to an embodiment of the present invention have brightness substantially the same as or larger than the brightness of products employing a conventional optical sheet.

In accordance with embodiments of the present invention, an optical sheet, a method of manufacturing the optical sheet, and a display apparatus having the optical sheet results in an improved a viewing angle may by concave patterns formed at the peak portions of prism patterns. A protective sheet or a display panel disposed on the optical sheet may be prevented from being scratched since the concave patterns formed at the peak portions reduce an area by which the optical sheet makes contact with the protective sheet or the display panel. The display apparatus including the optical sheet according to the embodiments of the present invention may not require the protective sheet.

In addition, handling properties of the optical sheet according to the embodiments of the present invention may be improved since convex patterns formed at valley portions of the prism patterns increase the haze level of the optical sheet. The display apparatus including the optical sheet according to the embodiments of the present invention may not require a diffusing sheet and a light concentrating sheet since the convex patterns formed at the valley portions of the prism patterns diffuse and concentrate light.

Having described the example embodiments of the present invention, it is noted that various changes, substitutions and alterations can be made herein without departing from the spirit and scope of the invention as defined by the appended claims.

What is claimed is:

1. An optical sheet comprising:
   a base film;
   a plurality of prism patterns formed on an upper surface of the base film, each of the prism patterns having the shape of a trigonal prism and including a first inclined surface and a second inclined surface which are inclined with respect to the upper surface of the base film and meet each other at a peak portion, wherein the first inclined surface of a first prism pattern and the second inclined surface of a second prism pattern adjacent to the first prism pattern meet each other at a valley portion;
   a plurality of first embossing patterns formed at the valley portion; and
   a plurality of second embossing patterns on the peak portion, wherein the first embossing patterns have a non-prismatic convex shape and spanning from the first inclined surface of the first prism pattern to the second inclined surface of the second prism pattern adjacent the first prism pattern, and the second embossing patterns have a concave shape.

2. The optical sheet of claim 1, wherein the second embossing patterns have a diameter of about 2 μm to about 3 μm.

3. The optical sheet of claim 1, wherein the first embossing patterns have a substantially hemispherical shape.

4. The optical sheet of claim 1, wherein the first embossing patterns have a diameter of about 1 μm to about 2 μm.

5. The optical sheet of claim 1, wherein the peak portion has a ripple shape.

6. The optical sheet of claim 4, wherein the valley portion has a ripple shape.

7. The optical sheet of claim 1, wherein an angle between the first and second inclined surfaces is in a range of about 80 degrees to about 100degrees.

8. The optical sheet of claim 1, further comprising a coating layer formed on a lower surface of the base film.

9. A display apparatus comprising:
   a light-generating unit;
   an optical sheet disposed on the light-generating unit, the optical sheet comprising:
      a base film;
      a plurality of prism patterns formed on an upper surface of the base film, each of the prism patterns having the shape of a trigonal prism and including a first inclined surface and a second inclined surface which are inclined with respect to the upper surface of the base film and meet each other at a peak portion, wherein the first inclined surface of a first prism pattern and the second inclined surface of a second prism pattern adjacent to the first prism pattern meet each other at a valley portion;
      a plurality of first embossing patterns formed on the peak portion, wherein the first embossing patterns have a concave shape; and
      a plurality of second embossing patterns formed at the valley portion, wherein the second embossing patterns have a non-prismatic convex shape and spanning from the first inclined surface of the first prism pattern to the second inclined surface of the second prism pattern adjacent the first prism pattern; and
   a display panel disposed on the optical sheet.

10. The display apparatus of claim 9, wherein the second embossing patterns have a substantially hemispherical shape.

11. The display apparatus of claim 9, wherein each of the second embossing patterns is smaller than each of the first embossing patterns.

* * * * *